United States Patent
Witkowski (10) Patent No.: US 8,837,608 B2
(45) Date of Patent: Sep. 16, 2014

(54) SYSTEMS AND METHODS FOR CONFIGURING AND OPERATING A WIRELESS CONTROL SYSTEM IN A VEHICLE FOR ACTIVATION OF A REMOTE DEVICE

(71) Applicant: Johnson Controls Technology Company, Holland, MI (US)

(72) Inventor: Todd R. Witkowski, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 105 days.

(21) Appl. No.: 13/691,526

(22) Filed: Nov. 30, 2012

(65) Prior Publication Data

US 2013/0142269 A1 Jun. 6, 2013

Related U.S. Application Data

(60) Provisional application No. 61/566,302, filed on Dec. 2, 2011.

(51) Int. Cl.
*H04L 27/00* (2006.01)
*H04B 7/06* (2006.01)
*H04B 17/00* (2006.01)

(52) U.S. Cl.
CPC .......... *H04B 17/0012* (2013.01); *H04B 7/0689* (2013.01)
USPC ........... 375/259; 375/296; 375/219; 370/328; 370/499; 455/517; 455/63.4

(58) Field of Classification Search
USPC .......... 375/259, 295, 296, 219; 370/328, 499; 455/63.4, 517
See application file for complete search history.

(56) References Cited

U.S. PATENT DOCUMENTS

| | | | |
|---|---|---|---|
| 8,548,090 B2 * | 10/2013 | Higuchi | 375/295 |
| 8,619,671 B2 * | 12/2013 | Kwon et al. | 370/328 |
| 2010/0120460 A1 * | 5/2010 | Karlsson et al. | 455/517 |
| 2013/0165050 A1 * | 6/2013 | Kim et al. | 455/63.4 |

* cited by examiner

*Primary Examiner* — Eva Puente
(74) *Attorney, Agent, or Firm* — Foley & Lardner LLP; Scott P. Ryan (57) ABSTRACT

Control systems for mounting in a vehicle are configured for transmitting a control signal to a receiver associated with a remote device. A control system receives a first control signal associated with a first transmission scheme. The system determines a bit pattern of the first control signal, and, based on the determined bit pattern, the system determines a second transmission scheme.

20 Claims, 4 Drawing Sheets

SYSTEMS AND METHODS FOR CONFIGURING AND OPERATING A WIRELESS CONTROL SYSTEM IN A VEHICLE FOR ACTIVATION OF A REMOTE DEVICE

CROSS-REFERENCE TO RELATED APPLICATIONS

The present application claims the benefit of and priority to U.S. Provisional Application No. 61/566,302, entitled, "Systems and Methods for Configuring and Operating a Wireless Control System in a Vehicle for Activation of a Remote Device," filed Dec. 2, 2011, the disclosure of which is incorporated by reference in its entirety.

BACKGROUND

The present disclosure generally relates to systems and methods for configuring a wireless control system of a vehicle.

Wireless control systems are provided in vehicles for activities such as actuating a remote device (e.g., a garage door opener), establishing a data communication link with a remote system, establishing a voice communication link with a portable electronic device, and for other purposes.

Vehicle-based wireless control systems are challenging and difficult to configure for relatively universal use with a variety of remote devices, systems, and/or portable electronic devices.

Improved systems and methods for configuring a wireless control system of a vehicle are needed.

SUMMARY

One implementation relates to a method for training a trainable transmitter in a vehicle using an original transmitter. The method may include receiving a first control signal from the original transmitter. A determination of a bit pattern of the first control signal may be made without decoding the first control signal. The bit pattern may be associated with a first transmission scheme. A determination may be made of a second transmission scheme based on the determined bit pattern. The second transmission scheme may be different from the first transmission scheme. The second transmission scheme may be stored in a memory associated with a user-selectable transmission feature. The method may further include transmitting a second control signal using the second transmission scheme stored in the memory in response to a user selection of the user-selectable transmission feature.

Another implementation relates to a method of training a trainable transmitter in a vehicle. The method may include receiving a first control signal at two frequencies according to a first transmission scheme from an original transmitter. The method may include determining a bit pattern of the first control signal without decoding the received first control signal. A determination may be made of a second transmission scheme based on the determined bit pattern. The second transmission scheme may be different from the first transmission scheme. The second transmission scheme and the two frequencies may be stored in a memory associated with a user-selectable transmission feature. The method may further include transmitting a second control signal in response to a selection of the user-selectable transmission feature. The second control signal may be generated using the second transmission scheme and transmitted at the two frequencies.

Yet a further implementation relates to a control system for operating a remote device. The control system may include a receiver configured to receive a first control signal that is associated with a first transmission scheme. The system may further include a transmitter configured to transmit a second control signal. The system may also include a processing circuit configured to determine a bit pattern of the first control signal, determine a second transmission scheme based on the determined bit pattern, and generate the second control signal using the second transmission scheme. The second transmission scheme may be different from the first transmission scheme.

BRIEF DESCRIPTION OF THE FIGURES

Various implementations taught herein are illustrated by way of example, and not by way of limitation, in the figures of the accompanying drawings, in which.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and embodiments of, methods, apparatuses, and systems for configuring and operating a wireless control system mounted in a vehicle for activation of a remote device. The various concepts introduced above and discussed in greater detail below may be implemented in any of numerous ways, as the described concepts are not limited to any particular manner of implementation. Examples of specific implementations and applications are provided primarily for illustrative purposes.

Referring generally to the Figures, a wireless control system (e.g., a trainable transceiver) is configured to complete a training process for learning a control signal transmission scheme for activating a remote device. The training process includes transmitting a second control signal according to a second transmission scheme that is different from a first transmission scheme received from an original transmitter near the beginning of the training process. Advantageously, trainable transmitters constructed according to embodiments contained herein may be compatible with a larger number of transmission schemes and may be perceived as having improved performance despite electronics components that are not fully compatible with the transmission scheme as received from the original transmitter.

Figure 1:
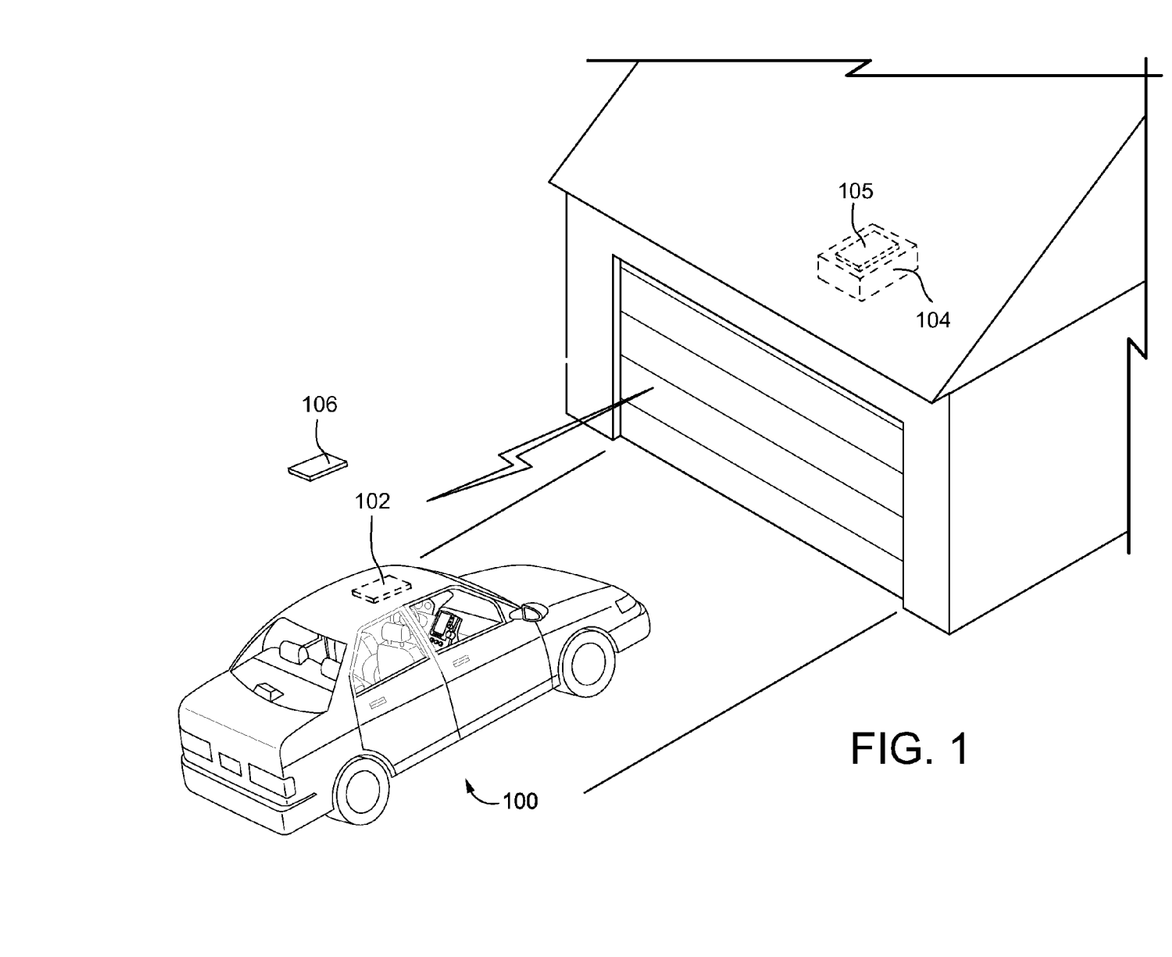
FIG. 1 is a perspective view of a vehicle having a control system configured to provide a control signal to a remote device such as a garage door opener, according to an exemplary embodiment.

Referring now to FIG. 1, a perspective view of a vehicle 100 having a control system 102 configured to provide a control signal (e.g., a formatted radio frequency signal) to a remote device 104 is shown, according to an example implementation. According to the implementation shown FIG. 1, remote device 104 is a garage door opener for opening a garage door such as the garage door illustrated in FIG. 1. Remote device 104 includes or is associated with a receiver 105 that receives the control signal and causes (e.g., via one or more signals) the garage door opener to open the garage door based on the received control signal. A receiver 105 included or associated with a remote device 101, such as garage door opener, is typically configured to cause the remote device 104 to actuate or change states only if the control signal is determined to be from an authorized device. The receiver 105 typically determines whether or not the control signal is from an authorized device based on characteristics of the control signal. For example, a receiver 105 included or associated with the remote device 104 may be configured to cause the remote device 104 to actuate or change state if the control signal is sent at a certain frequency or frequencies, includes representations of particular codes, is formatted in a particular way, includes a certain cryptography key, is modulated a certain way, and/or the like.

A receiver, such as receiver 105, included or associated with a remote device, such as remote device 104, is typically associated with one or more original portable transmitters, such as portable transmitter 106, configured to provide an appropriately formatted control signal to the receiver. Portable transmitter 106 may be an original transmitter sold with remote device 104 and/or previously configured for communications with receiver 105 of remote device 104. Control system 102 mounted in vehicle 100 may not be pre-configured for communications with the user's particular remote device 104 when first sold to a user (e.g., with vehicle 100 or otherwise). Vehicle control system 102 can be configured (e.g., trained) for wireless communications with receiver 105 of remote device 104 via a one or more configuration processes (e.g., training processes, setup processes, etc.). For example, control system 102 can include a radio frequency receiver configured to receive radio frequency control signals from portable transmitter 106 to configure itself using the received radio frequency control signals. Such vehicle control systems are often referred to as trainable transmitters or trainable transceivers.

Figure 2:
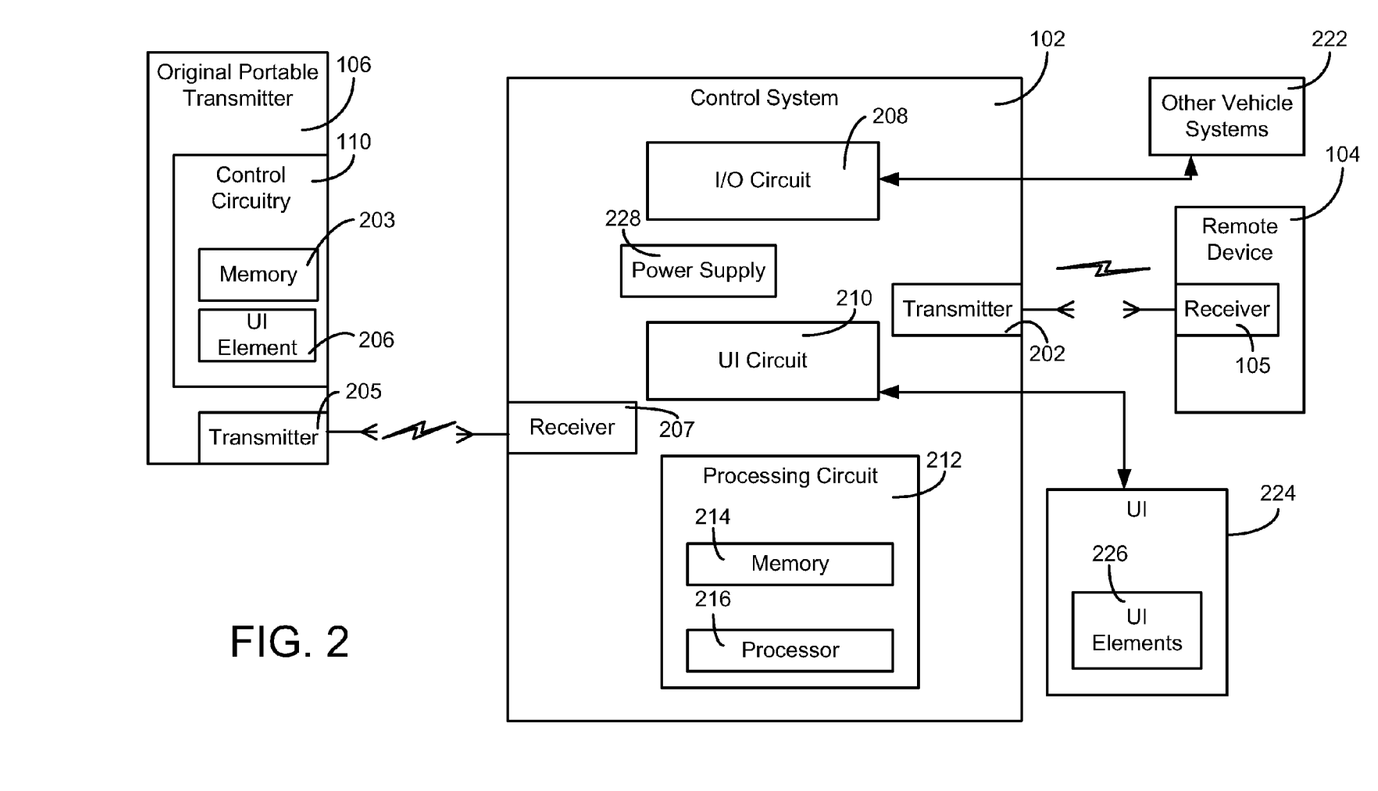
FIG. 2 is a block diagram of a system, such as that illustrated in FIG. 1, according to an exemplary embodiment.

Referring now to FIG. 2, a block diagram of the system illustrated in FIG. 1 is shown, according to an example implementation. Original portable transmitter 106 is shown to include control circuitry 110, transmitter 205, user interface (UI) element 206, and memory 203. Receiver 207 of control system 102 may be configured to receive information from original portable transmitter 106 via RF communications. Using the received information, control system 102 can configure itself for authenticated transmissions from the control system 102's transmitter 202 to remote device 104's receiver 105.

Control circuitry 110 of original portable transmitter 106 may generally be configured to format a control signal for transmission to receiver 105 of remote device 104 via transmitter 205 or to cause transmitter 205 to format and send the control signal. For example, control circuitry 110 may be configured to apply a transmission scheme (e.g., message format, encryption scheme, encryption codes, etc.) to generate the control signal for transmission to the receiver 105 of the remote device 104. Control circuitry 110 is shown to include memory 203 for storing information, such as one or more transmission schemes, frequencies, etc., regarding the control signal or remote device 104. Control circuitry 110 further includes UI elements 206 (e.g., buttons, switches, touch-sensitive elements, voice recognition systems, touch screens, etc.) which may be pressed or otherwise used by a user of original portable transmitter 106 to interact with features of the original portable transmitter 160, such as to cause original portable transmitter 106 to transmit information.

Control system 102 is shown to include transmitter 202 (e.g., a radio frequency (RF) transmitter), I/O circuit 208, user interface (UI) circuit 210, and processing circuit 212. According to an example implementation, control system 102 is configured to be mounted to a vehicle, such as vehicle 100 (e.g., mounted in a vehicle interior location, a center stack location, a dashboard location, a center console, an overhead console, a floor console, an instrument panel, a door panel, a visor, a rear-view mirror, a headliner location, in multiple vehicle locations, etc.).

According to an example implementation, control system 102 may transmit a control signal to receiver 105 of remote device 104 based on user input signals received from user interface (UI) 224 at UI circuit 210. For example, when one or more of a plurality of UI elements 226 are pressed or otherwise interacted with by a user, UI circuit 210 and processing circuit 212 may cause RF transmitter 202 to transmit a control signal associated with the pressed or activated UI element 226. The transmission of the control signal can also be triggered based on input received from other vehicle systems 222 via I/O circuit 208. Other vehicle systems 222 may include, for example, a positioning device (e.g., GPS receiver) configured to cause RF transmitter 202 to transmit the control signal based on position information received at I/O circuit 208. Other vehicle systems 222 may also include vehicle communications systems (e.g., configured to receive data from a mobile phone, an Internet source, or otherwise), vehicle center stack control systems, voice recognition systems, body electronics modules configured to receive signals from key fobs or other remote controls, and the like that may be configured to provide signals that control or otherwise affect the behavior of control system 102.

Processing circuit 212 is shown to include memory 214 and processor 216. Processing circuit 212 may be configured to initiate and control the transmission of a control signal by controlling and/or providing information to transmitter 202. When information is received by a circuit 208 or 210, processing circuit 212 may be configured to store the received information in memory 214, to process the received information using processor 216, and/or to set variables stored in memory 214. Control system 102 is further shown to include a power supply 228 for supplying a power source to control system 102.

Processing circuit 212 and/or processor 216 may be or include one or more integrated circuits, application specific integrated circuits, general purpose processors, memory chips, logic gates, field programmable gate arrays, and/or other electronics components for processing user input, received data communications, and received control signals from other components attached to processing circuit 212 and/or processor 216. Memory 214 may be any type of memory device, may be local to processing circuit 212 (as shown), remote from processing circuit 212, or otherwise communicably coupled to processing circuit 212. Memory 214 can be or include random access memory, read only memory, and/or any other type of memory. Memory 214 can be configured to store codes for communication to various types of remote devices, algorithms for generating codes or control signals for various types of remote devices, variables for storing system or user set values, variables for storing pointers to codes to be used, constant values, transmission schemes, temporary values, receptions from an original transmitter, computer code for execution by processor 216 for executing the various processes described herein or supporting functions, or the like.

Remote device 104 generally includes a receiver 105 for receiving information regarding the use of remote device 104. For example, receiver 105 may be configured to receive a control signal commanding remote device 104 to perform an activity such as opening a garage door. Receiver 105 can be configured to receive a narrow band of frequencies, a wide band of frequencies, communications centered around one or more frequencies, or any type of radio frequency receiver configured to receive communications from original portable transmitter 106 and/or vehicle control system 102. According to an example implementation, receiver 105 is configured to receive radio frequency communications at around 285-450 Mhz. In another example implementation, receiver 105 may be configured to receive radio frequency communications at around 40 MHz, 868 MHz, 915 MHz, and/or any other frequency. Receiver 105 may also be configured to process the signals received to determine if the signals are from an authorized source or otherwise expected. For example, receiver 105 may decode or demodulate received transmissions or check decoded or demodulated transmissions against a cryptographic algorithm, against a checksum, against a stored value, against a count, or against any other criteria.

From time to time, new garage door receivers and transmitters enter the market. If the new system uses a new transmission scheme (e.g., message format, encryption scheme, encryption codes, etc.) that the trainable transmitter is not configured to learn and/or reproduce, the usefulness of the trainable transmitter may be reduced. There are a variety of reasons why the trainable transmitter may not be configured to generate a control signal according to the new transmission scheme. For example, the trainable transmitter may need a number key to generate the control signal according to the new transmission scheme. In some instances, the trainable transmitter may not have access to the key. There may also be physical reasons why the trainable transmitter is not capable of generating a control signal according to the new transmission scheme (e.g., the new transmission scheme may require a type of RF modulation that the trainable transmitter does not have the circuitry to provide). When a new garage door receiver for a manufacturer enters the market, the garage door opener may be backwards compatible to operate when a control signal generated according to an old transmission scheme of that manufacturer is received. However, in some instances the original transmitter sold with the new garage door opener may not be configured to transmit a control signal in accordance with the old transmission scheme. Rather, the original transmitter may only transmit a control signal in accordance with the new transmission scheme. If the trainable transmitter is unable to be configured to generate a control signal in accordance with the new transmission scheme, but the new garage door opener is backwards compatible with control signals generated in accordance with the old transmission scheme, performance may advantageously be improved using a trainable transmitter configured to: recognize the new transmission scheme, select the old transmission scheme, and train (i.e., configure itself) to generate a control signal in accordance with the old transmission scheme.

In one example implementation, a trainable transmitter not configured to learn and/or transmit a control signal according to the new transmission scheme may be configured to recognize a bit pattern associated with the new transmission scheme. For example, the trainable transmitter may be configured to receive a control signal transmitted from an original transmitter that transmits a control signal in accordance with a new transmission scheme. The trainable transmitter may be configured to determine a number of bits of the control signal, a number of bits for a portion of a control signal, a sequence of bits, and/or other bit pattern. Based on the determined bit pattern, the trainable transmitter may be configured to determine a related transmission scheme, which is different from the new transmission scheme. For instance, an old transmission scheme from a first manufacturer may be associated with a known bit pattern of a control signal. If the bit pattern of the received control signal from the original transmitter is determined to be the same as the bit pattern associated with the old transmission scheme, the trainable transmitter may be configured to transmit a control signal in accordance with the old transmission scheme. Thus, the trainable transmitter may be able to configure itself to generate control signals in accordance with the old transmission scheme that is backward compatible with the garage door opener receiver. Since the garage door opener receiver accepts both the new scheme and the old scheme, the trainable transmitter is able to activate the garage door opener receiver without generating control signals according to the new transmission scheme.

Figure 3:
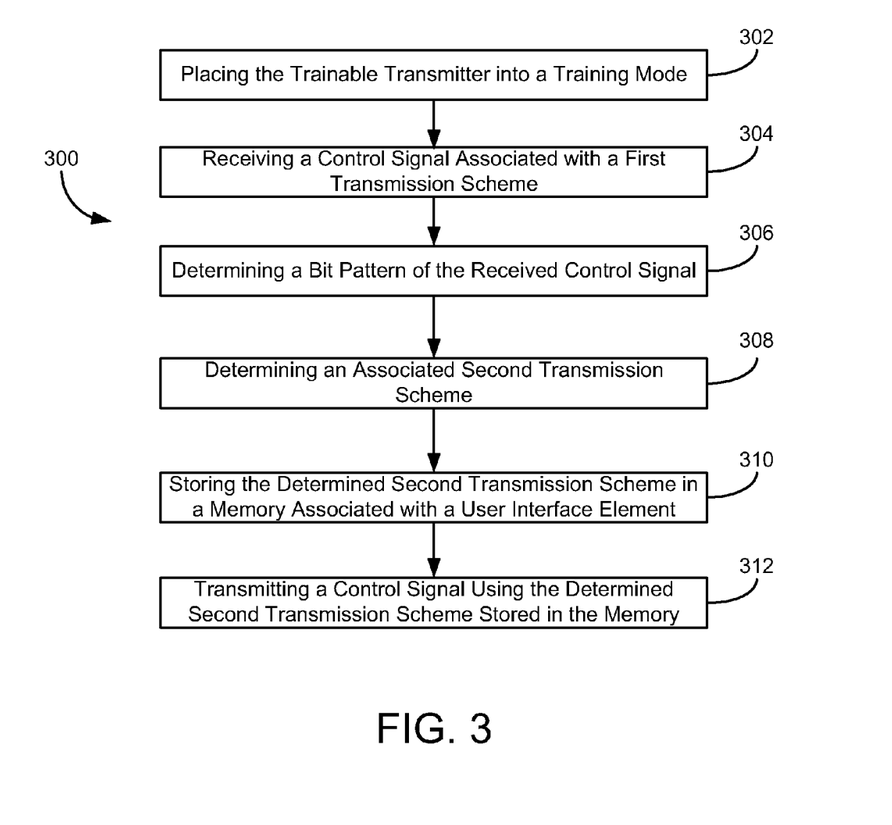
FIG. 3 is a flow diagram of a process for training a trainable transmitter to transmit a second control signal according to a second transmission scheme that is different from a first transmission scheme of a received first control signal, according to an exemplary embodiment.

FIG. 3 depicts a flow diagram of an example process 300 for operation of the trainable transmitter (i.e., control system 102) of FIG. 2, according to an example implementation. Process 300 may include placing the trainable transmitter into a training mode (step 302). For example, a user may press and hold a user interface element to enter the training mode and/or may activate the training mode through other ways (e.g., selecting a training mode button, switch, touch screen element, etc.).

Process 300 may include receiving a control signal associated with a first transmission scheme (step 304). For example, the original transmitter may be caused to transmit the control signal in accordance with the first transmission scheme in response to a user pressing a button on the original transmitter, such as a button that would normally cause opening of the associated remote garage door opener. In some instances, the control signal associated with the first transmission scheme may be received from the new garage door opener and/or from the new garage door receiver. A button or other user interface element of the garage door opener and/or the new garage door receiver may be operable to cause a transmission of a control signal from the garage door opener and/or from the new garage door receiver. In some instances, the first transmission scheme may be a new transmission scheme (e.g., associated with newly released garage door receiver systems).

In some instances, the trainable transmitter may be unable to be trained to generate a control signal in accordance with the new transmission scheme. For example, the trainable transmitter may need a number key to generate the control signal according to the new transmission scheme, and the trainable transmitter may not have access to the key. Of course, other aspects to generate the new control signal may not be reproducible by the trainable transmitter and/or may be omitted. In another example, the trainable transmitter may not be capable of generating a control signal according to the new transmission scheme due to a type of RF modulation that the trainable transmitter may not have the circuitry to provide. The trainable transmitter may store the received control signal for the determination of the bit pattern, in some instances.

A determination may be made of a bit pattern of the received control signal (step 306). In an example implementation, a bit pattern of the received control signal may be determined without fully decoding the received control signal. For example, a received control signal may include a preamble portion and a data message portion. The bit pattern may correspond to a number of bits for the preamble portion, a number of bits for the data message portion, a total number of bits of the control signal, a proportion of bits of the preamble portion to the bits of the data message portion, a number of bits for a non-data message portion, a total number of bits for the non-data message portion and the data message portion, a proportion of bits of the non-data message portion to the number of bits of the data message portion, and/or any other bit pattern. For example, a control signal may include a 12-bit preamble followed by a 72-bit data message portion. Such a control signal may exist as received from an original transmitter implementing the Genie Intellicode 2 format for the control signal. Alternatively or in addition to the bit pattern, other aspects of the received control signal may be evaluated as well, such as a carrier frequency or frequencies.

An associated second transmission scheme may be determined based on the determined bit pattern (step 308). For instance, one or more bit patterns may be associated with a manufacturer of garage door opener systems. Once the bit pattern is determined, the processing circuit may be configured to retrieve a data table or other relational file from a storage medium, such as memory 214 and/or otherwise, to determine an associated manufacturer ID based on the bit pattern. The data table or relational file may have one or more bit patterns and/or other characteristics of the control signal associated with a manufacturer ID. In some instances, the data table may, in addition to or lieu of the manufacturer ID, include an associated second transmission scheme (e.g., a message format, an encryption scheme, encryption codes, etc.). The associated second transmission scheme may be different than the first transmission scheme of the received control signal.

In some implementations, the data table or other relational file may be updated (either automatically or manually) with bit pattern data for new systems. For example, the trainable transmitter may be wirelessly updated (e.g., over a cell phone network, over a WiFi network, etc.) and/or may be updated through a physical connection (e.g., via a plug-in module, via a thumb drive, via a wired connection, etc.). In some implementations, the trainable transmitter may be updated periodically (e.g., each time a wireless connection is established; on a monthly, weekly, and/or yearly basis; etc.) or on-demand (e.g., via user interaction with a user interface). Thus, the trainable transmitter may be updated for new control signals and bit patterns. In some embodiments, the trainable transmitter may be able to recognize the new bit patterns even if the transmitter is not configured to transmit on new or updated carrier frequencies. In such circumstances, the trainable transceiver may not be able to train to a new control signal received at the trainable transceiver from an original transmitter (i.e., an original hand-held transmitter associated with a garage door receiver).

The determined second transmission scheme may be stored in a memory associated with a user interface element (step 310). For example, for a trainable transmitter having several user interface elements, the determined second transmission scheme may be stored in a memory that is associated with one of the user interface elements such that user selection of that user interface element causes the trainable transmitter to generate a control signal using the second transmission scheme and to output the generated control signal from a transmitter. Thus, several different transmission schemes may be stored and associated with several user interface elements of a trainable transmitter.

When training is complete (additional steps may be conducted to synchronize the trainable transmitter with the garage door opener receiver), the trainable transmitter may transmit a control signal using the determined second transmission scheme stored in the memory (step 314). For instance, using the transmission scheme, the processing circuit of the trainable transmitter may be configured to generate a control signal and cause the transmitter to output the generated control signal. If the remote device, such as a garage door opener receiver, is configured to receive and be activated by a control signal generated using the second transmission scheme, the trainable transmitter may be used to operate the remote device without using the first transmission scheme. Thus, the utility of the trainable transmitter may be prolonged even if new transmission schemes are introduced that the trainable transmitter may be unable to be trained for and/or transmit.

In one example, the first transmission scheme may be a Genie Intellicode 2 transmission scheme which differs from (and is newer than) an Genie Intellicode 1 transmission scheme. A trainable transmitter may be unable to learn and/or retransmit Intellicode 2 control signals, but via a determination of a bit pattern (e.g., recognizing a 12-bit preamble portion followed by a 72-bit data message portion, as exists under Intellicode 2) a determination of a second, associated transmission scheme may be made such that the trainable transmitter may be configured to transmit a control signal using the older Intellicode 1 transmission scheme. Some Genie transmitters output the Intellicode 2 control signals at both 315 MHz and 390 MHz. Rather than merely training at the first or primarily detected frequency, the trainable transmitter may be configured to transmit the generated control signal, such as that generated using the Intellicode 1 transmission scheme, at a certain frequency, such as 315 MHz, regardless of whether the received control signal was detected at a different or multiple frequencies during training, such as at 315 or 390 MHz.

In another example, regardless of whether control signal was detected at different or multiple frequencies, such as 315 or 390 MHz used in an Intellicode 2 transmission scheme, the trainable transmitter may be configured to transmit a control signal using multiple frequencies, e.g., at 315 MHz and 390 MHz using the Intellicode 1 transmission scheme. The intent for such a transmission may be to increase the chance of successful transmission from the trainable transmitter to the remote device, such as a garage door opener receiver, even if one of the frequencies may be particularly noisy. The trainable transmitter may be configured to transmit a generated control signal at a first frequency, such as at 315 MHz, then at a second frequency, such as at 390 MHz, in succession (e.g., one after the other) or the control signals may be transmitted at both frequencies simultaneously. For example, when a user presses a button trained to or for the Intellicode 1 transmission scheme, the trainable transmitter may respond to the button press by transmitting a control signal generated using the Intellicode 1 transmission scheme at the first frequency (e.g., 315 MHz), the same message at the second frequency (e.g., 390 MHz), and then back to the first frequency, etc., until the button is released.

If the trainable transmitter received the control signal at a first frequency initially (i.e., during training), such as 315 MHz, then this may be the frequency that begins the transmission sequence. If the trainable transmitter received the control signal at a second frequency initially (i.e., during training), such as 390 MHz, then this may be the frequency that begins the transmission sequence. With some systems, it may be more likely that the frequency of the received control signal is the frequency that should be used for subsequent transmissions of control signals to a remote device, such as a garage door opener receiver. Accordingly, transmission of the frequency of the received control signal first may help reduce latency during operating conditions in which the first frequency is not too noisy for successful transmission. It should be noted that frequencies other than 315 or 390 MHz may be used and still be within the scope of the present application (unless expressly limited by the claims). Moreover, although Intellicode 1 and Intellicode 2 transmission schemes are used in this example, any other message format or transmission scheme may be used and is within the scope of the present application.

Referring again to FIG. 2, in varying embodiments of the invention, control system 102 (i.e., a trainable transmitter for use or mounting in a vehicle) can be trained using an original portable transmitter 106 associated with a remote device 104's receiver 105. Receiver 207 of the control system 102 can receive a control signal from the original transmitter 106. The signal may be associated with a first transmission scheme. Receiver 207 can provide the received control signal (e.g., an analog or digital representation of the received control signal) to processing circuit 212. The processing circuit 212 of the control system 102 may determine a bit pattern of the received control signal without fully decoding the received control signal. Processing circuit 212 may then determine a second, associated transmission scheme (e.g., an older transmission scheme that is also compatible with the remote device 104's receiver 105) than the first transmission scheme of the received control signal in response to the determination of the bit pattern. The determination of the second, associated transmission scheme may be based on an association of the bit pattern to the second, associated transmission scheme and/or on an association with a manufacturer type and/or ID. The second, associated transmission scheme (i.e., an identifier thereof, characteristics thereof, etc.) may then be stored in a memory associated with a user transmission option (e.g., a button of UI 224, a particular UI element of UI elements 226, a button of a HomeLink device, etc.). Once trained, the control system 102 and, more particularly, the processing circuit 212 can use the transmitter 202 to transmit a new control signal to the remote receiver 105 using the second, associated transmission scheme stored in the memory 214.

In some implementations, the control signal may be received at a first frequency and a second frequency from the original portable transmitter 106. In such implementations, processing circuit 212 may be configured to select one of the first frequency and the second frequency for storing in the memory and for use in transmitting the new control signal. Such selection may be based on, e.g., the determination of the bit pattern of the first transmission scheme or an association of the second, associated transmission scheme with a frequency.

Figure 4:
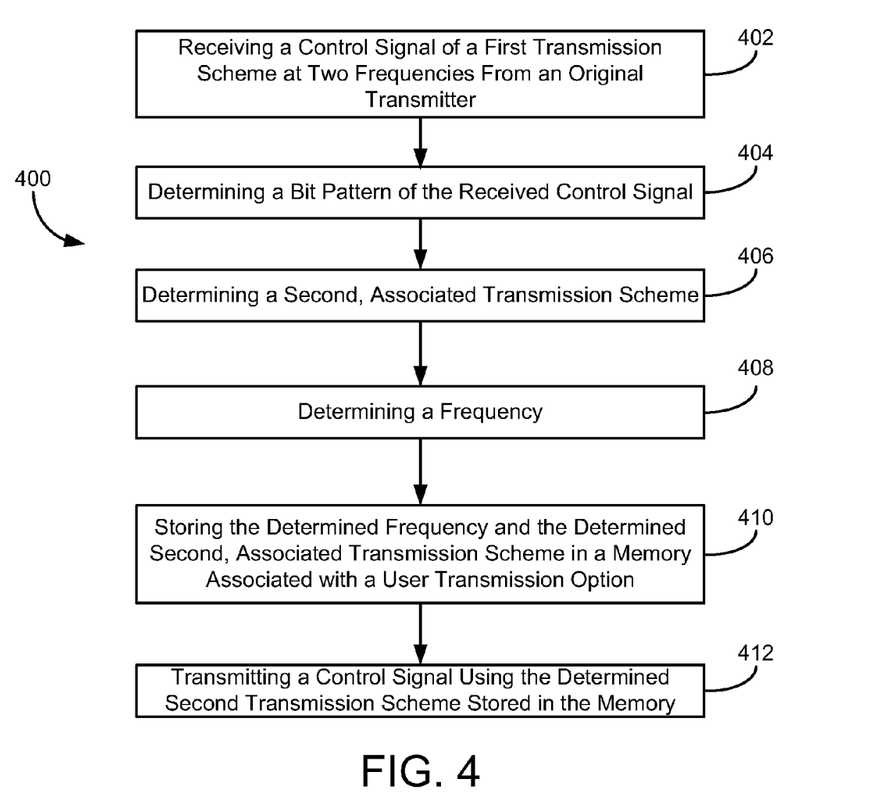
FIG. 4 is a flow diagram of another process for training a trainable transmitter to transmit a control signal at a determined frequency, according to another exemplary embodiment.

Another implementation, shown in FIG. 4, relates to a method 400 of training a trainable transmitter in a vehicle. At the trainable transmitter, the method 400 includes receiving a signal at two frequencies according to a first transmission scheme from an original transmitter (step 402). The two frequencies may be about 315 MHz and 390 MHz.

The method 400 may further include determining a bit pattern of the received control signal without attempting to decode the signal (step 404). Determining the bit pattern of the received control signal may include identifying a number of bits of the received control signal. Determining the bit pattern of the received control signal may include identifying bits of a preamble portion of the received control signal. Determining the bit pattern of the received control signal may include identifying bits associated with a preamble portion and bits associated with a data message portion. Determining the bit pattern of the received control signal may include identifying a 12-bit preamble portion followed by a 72-bit data message portion. Determining the bit pattern of the received control signal may include identifying a data message portion of the received control signal and a non-data message portion of the received control signal. Of course, other bit patterns may be determined as well and the foregoing are merely examples.

The method 400 also include determining a second, associated transmission scheme which is different than a first transmission scheme of the received control signal in response to the determined bit pattern (step 406). In some implementations, the bit pattern is associated with a first transmission scheme that the trainable transmitter is not configured to transmit. The first transmission scheme of the received control signal may be a first rolling code format and the second, associated transmission scheme may be a second rolling code format. In some instances, the determination of the second, associated transmission scheme may include using a local database or data table to determine the second, associated transmission scheme based on the determined bit pattern. In some instances, the determination of the second, associated transmission scheme may include transmitting the bit pattern to a remote device for determination (e.g., querying a remote database over a wireless and/or other data connection). Of course other ways of determining the second, associated transmission scheme based on the bit pattern may be used as well.

The method 400 may include determining a frequency (step 408). The determination of the frequency may include selecting the first frequency of the received control signal. For example, the two received frequencies may include 315 MHz and 390 MHz with 315 MHz selected due to it being the first frequency received. In some other instances, the determination of the frequency may include determining the frequency based on an association of a frequency with the determined bit pattern (e.g., a database or data table may include an entry of a frequency associated with one or more bit patterns). Still other ways of determining the frequency may be used.

The method 400 may further include storing the determined frequency and the determined second, associated transmission scheme in a memory associated with a user transmission option (step 410). The method 400 may also further include transmitting a control signal to the remote receiver using the determined second, associated transmission scheme and the determined frequency stored in the memory (step 412).

Various Alternative Configurations of the Above-Described Implementations:

While the example implementations illustrated in the figures and described herein are preferred, it should be understood that the implementations are offered by way of example only. Accordingly, the present application is not limited to a particular implementations, but extends to various modifications that nevertheless fall within the scope of the appended claims.

The construction and arrangement of the systems as shown in the various example implementations are illustrative only. Although only a few implementations have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative implementations. Other substitutions, modifications, changes, and omissions may be made in the design, operating conditions and arrangement of the example implementations without departing from the scope of the present disclosure. For example, although some of the implementations described above are described with reference to rolling code control signals, other implementations may be configured to conduct the same activities on, with, or using fixed code control signals or a combination of rolling code control signals and fixed code control signals.

Implementations within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for training a trainable transmitter in a vehicle using an original transmitter, comprising:
    receiving a first control signal from the original transmitter;
    determining a bit pattern of the first control signal without decoding the first control signal, wherein the bit pattern is associated with a first transmission scheme;
    determining a second transmission scheme based on the determined bit pattern, wherein the second transmission scheme is different from the first transmission scheme;
    storing the second transmission scheme in a memory associated with a user-selectable transmission feature; and
    transmitting a second control signal using the second transmission scheme stored in the memory in response to a user selection of the user-selectable transmission feature.

2. The method of claim 1, wherein the trainable transmitter is unable to transmit the second control signal using the first transmission scheme.

3. The method of claim 1, wherein the step of determining the bit pattern of the first control signal comprises determining a number of bits of the first control signal.

4. The method of claim 1, wherein the step of determining the bit pattern of the first control signal comprises determining a number of bits of a preamble portion of the first control signal.

5. The method of claim 1, wherein the step of determining the bit pattern of the first control signal comprises determining a first number of bits associated with a preamble portion of the first control signal and a second number of bits associated with a data message portion of the first control signal.

6. The method of claim 1, wherein the step of determining the bit pattern of the first control signal comprises determining a 12-bit preamble portion of the first control signal followed by a 72-bit data message portion of the first control signal.

7. The method of claim 1, wherein the step of determining the bit pattern of the first control signal comprises determining a data message portion of the first control signal and a non-data message portion of the first control signal.

8. The method of claim 1 further comprising:
    determining a transmission frequency; and
    storing in the memory the determined transmission frequency, wherein the step of transmitting the second control signal using the second transmission scheme includes transmitting at the second control signal at the determined frequency.

9. The method of claim 8, wherein the first control signal is received at a first frequency and a second frequency, wherein the step of determining a transmission frequency comprises selecting one of the first frequency and the second frequency.

10. The method of claim 8, wherein the first control signal is received at a first frequency and a second frequency, wherein the step of determining a transmission frequency comprises selecting a first received frequency from the first frequency and the second frequency.

11. The method of claim 8, wherein the step of determining a transmission frequency is based on an association of the transmission frequency with the determined bit pattern.

12. The method of claim 11, wherein the first control signal is received at a received frequency, wherein the transmission frequency is different from the received frequency.

13. A method of training a trainable transmitter in a vehicle, the method comprising:
    receiving a first control signal at two frequencies according to a first transmission scheme from an original transmitter;
    determining a bit pattern of the first control signal without decoding the received first control signal;
    determining a second transmission scheme based on the determined bit pattern, wherein the second transmission scheme is different from the first transmission scheme;
    storing the determined second transmission scheme and the two frequencies in a memory associated with a user-selectable transmission feature; and
    transmitting a second control signal in response to a selection of the user-selectable transmission feature, wherein the second control signal is generated using the second transmission scheme and transmitted at the two frequencies.

14. The method of claim 13, wherein the determined bit pattern comprises a preamble portion of the first control signal followed by a data message portion of the first control signal.

15. The method of claim 13, further comprising:
determining a first received frequency of the two frequencies;
wherein the step of transmitting the second control signal to the remote receiver at the two frequencies comprises sequentially transmitting at the first received frequency and then transmitting at a second frequency of the two frequencies.

16. The method of claim 15, wherein the sequential transmitting is repeated in response to continual selection of the user-selectable transmission feature.

17. The method of claim 13, wherein the first transmission scheme of the first control signal comprises a first rolling code format and the second transmission scheme comprises a second rolling code format.

18. A control system for operating a remote device, the control system comprising:
a receiver configured to receive a first control signal, wherein the first control signal is associated with a first transmission scheme;
a transmitter configured to transmit a second control signal; and
a processing circuit, wherein the processing circuit is configured to:
determine a bit pattern of the first control signal,
determine a second transmission scheme based on the determined bit pattern, wherein the second transmission scheme is different from the first transmission scheme, and
generate the second control signal using the second transmission scheme.

19. The system of claim 18, wherein the first transmission scheme comprises a first rolling code format and the second transmission scheme comprises a second rolling code format.

20. The system of claim 19, wherein the control system is unable to generate the first control signal.

* * * * *